United States Patent
Raaf

(10) Patent No.: US 6,785,514 B1
(45) Date of Patent: Aug. 31, 2004

(54) METHOD AND RADIO STATION FOR TRANSMITTING INFORMATION

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,891
(22) PCT Filed: Jul. 5, 1999
(86) PCT No.: PCT/DE99/02081
§ 371 (c)(1),
(2), (4) Date: Apr. 9, 2001
(87) PCT Pub. No.: WO00/04661
PCT Pub. Date: Jan. 27, 2000

(30) Foreign Application Priority Data

Jul. 14, 1998 (DE) ......................... 198 31 569

(51) Int. Cl.[7] ............................................. H04B 15/00
(52) U.S. Cl. ........................ 455/63.3; 455/450; 455/62; 455/161.1; 375/303
(58) Field of Search ........................... 455/161.1, 161.2, 455/168.1, 173.1, 175.1, 179.1, 180.1, 182.3, 192.3, 434, 450, 509, 515, 516, 63.1, 63.3, 452.1, 62; 375/295, 303, 211, 242, 240

(56) References Cited

U.S. PATENT DOCUMENTS

| 4,811,021 A | * | 3/1989 | Yoshimoto et al. .......... 342/361 |
| 5,295,138 A | * | 3/1994 | Greenberg et al. ........... 370/344 |
| 5,475,868 A | * | 12/1995 | Duque-Anton et al. ....... 455/62 |
| 6,131,012 A | * | 10/2000 | Struhsaker et al. ......... 455/3.05 |

FOREIGN PATENT DOCUMENTS

WO      WO 97/22223      6/1997

OTHER PUBLICATIONS

European Telecommunication Standard—GSM—Digital cellular telecommunications system (Phase 2); Radio transmission and reception (GSM 05.05 version 4.20. 1 pp. 3–43. XP 000638408—Variable Bandwidth RSSI Scanning, Mitchell, pp. 22–24.

* cited by examiner

Primary Examiner—Nguyen T. Vo
Assistant Examiner—Nhan T. Le
(74) Attorney, Agent, or Firm—Bell, Boyd & Lloyd LLC

(57) ABSTRACT

A method and radio station for transmitting information, wherein frequency channels of a frequency band are arranged in accordance with a first coarse raster system and a second fine raster system, the raster system being used, in particular, for performing an efficient frequency channel search and for the effective coding of the frequency channels.

11 Claims, 4 Drawing Sheets

METHOD AND RADIO STATION FOR TRANSMITTING INFORMATION

The present invention relates to a method and a radio station for transmitting information particularly by a mobile radio system, and further relates to the frequency channel arrangement used in such method and an appropriately adapted frequency channel search.

DESCRIPTION OF THE PRIOR ART

In conventional mobile radio systems such as the GSM (Global System for Mobile Communication) a multiple access method is used for utilizing the transmission capacities efficiently. In this method, the available frequency bands are also divided into a number of frequency channels in accordance with frequency division multiple access FDMA. For GSM operation, two frequency bands are reserved with 45 MHz band spacing: the 890 MHz to 915 MHz range for the uplink from the mobile station to the base station and the 935 MHz to 960 MHz range for the downlink operation from the base station to the mobile station. The frequency bands have a width of 25 MHz and are subdivided into 124 individual frequency channels of 200 KHz in each case. A frequency band is frequently divided further wherein the frequency subbands produced and the corresponding frequency channels are allocated to different network operators.

In future mobile radio systems, too, such as, the wide band CDMA system which is currently being standardized a frequency division multiple access method FDMA will be used together with a code division multiple access method CDMA. Such use possible will be in connection with another access method such as, for example, a time division multiple access method TDMA.

The present invention is thus directed toward arranging, structuring and allocating frequency ranges provided for communication via a mobile radio system to the individual network operators or subscribers, respectively, in such a manner that they can be used efficiently for transmitting information.

SUMMARY OF THE INVENTION

Accordingly, the present invention divides available frequency ranges into frequency bands (or at least one frequency band) and frequency channels, and arrange these frequency channels in accordance with a first coarse raster system and a second fine raster system, In such arrangement, at least the range of definition of the fine raster system is restricted.

Also in this arrangement, the coarse raster system can be described, for example, by a carrier spacing and the fine raster system can be described as subraster.

The result is that a certain frequency channel can be described using less information when this information is used for carrying out a correspondingly restricted frequency channel search, a network search or, respectively, synchronization can be carried out with less effort.

Another further development of the present invention provides that the coarse raster system and the fine raster system be respectively described by a variable information item and a constant information item. By storing the first constant information in a radio station and transmitting the second variable information between the radio stations, information for the unambiguous description of a frequency channel can be exchanged with less effort between the radio stations.

In a further embodiment of the present invention, the information is carried out in accordance with a CDMA method in which the radio signals spread by means of a CDMA code are transmitted essentially within a frequency channel. The arrangement of the frequency channels in accordance with the raster system is adapted to the conditions of transmission in such a manner that interference between the radio signals of the frequency channels is reduced to the greatest possible extent.

The present invention also includes methods for transmitting information between a first base station and a first mobile station, and between second base station and a second mobile station in which a number of frequency channels are available for transmitting the information. The transmission of information between the first base station and the first mobile stations takes place at least from time to time via radio signals essentially within a first frequency channel. The transmission of information between the second base station and the second mobile station takes place at least from time to time via radio signals essentially within a second frequency channel. In this arrangement, the first and second base station also can be allocated to different network operators or different layers of an hierarchical cell system.

Contemplated within the scope of the present invention is that transmission is understood to be the transmitting and/or receiving of messages.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
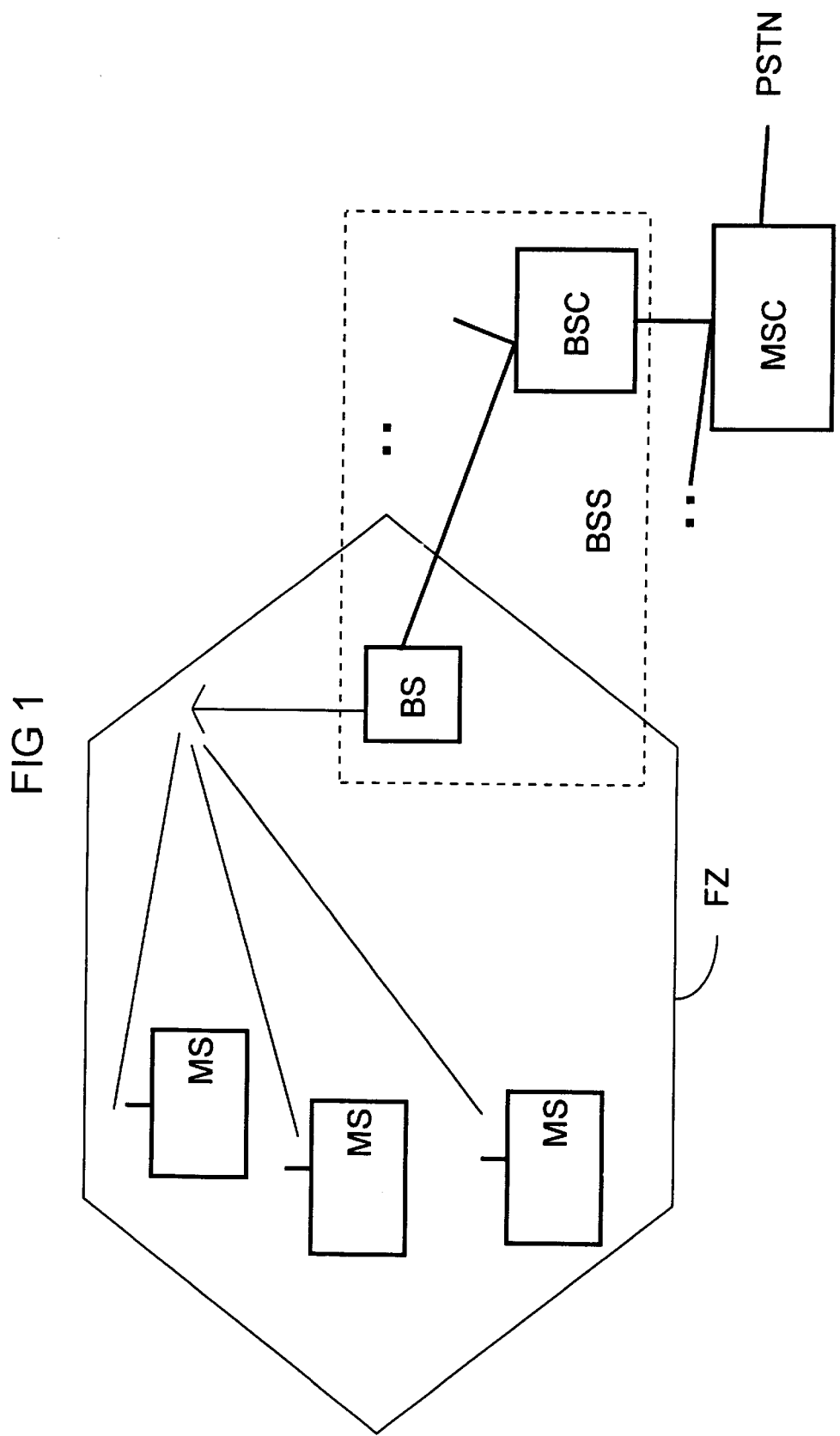
FIG. 1 shows a block diagram of a mobile radio system.

FIG 1 shows a cellular mobile radio system which includes a multiplicity of mobile switching centers MSC which are networked together or, respectively, establish the access to a fixed network PSTN. Furthermore, these mobile switching centers MSC are respectively connected to at least one base station controller BSC which also can be formed by a data processing system. Each base station controller BSC, in turn, is connected to at least one base station BS. Such a base station BS is a radio station which can set up a radio connection to other radio stations, so-called mobile stations MS, via a radio interface. Between the mobile stations MS and the base station BS allocated to these mobile stations MS, information can be transmitted via radio signals within radio channels f, which are located within frequency bands b. In this arrangement, the radio signals can be transmitted in accordance with known particularly digital methods for data transmission within predetermined frequency channels which also can be described by the corresponding carrier frequency. The signal power of the signals transmitted at these carrier frequencies is essentially, but not exclusively located within a predetermined range around the carrier frequency. This range also can be used for describing a frequency channel.

The range of the radio signals of a base station essentially defines a radio cell FZ. The allocation of resources such as frequency channels or sets of spread-spectrum code to radio cells FZ, and thus to the information to be transmitted, can be controlled by control devices, such as the base station controllers BSC. Base stations BS and a base station controller BSC can be combined to form a base station subsystem BSS.

The base station subsystem BSS also responsible for the radio channel administration and allocation, the data rate adaptation, the monitoring of the radio transmission link, hand-over procedures and the allocation. This base station subsystem BSS then signaling of the spread-spectrum codes to be used and transmits the signaling information necessary for this to the mobile stations MS.

In the implementation of mobile radio systems, the situation often arises that geographic regions are simultaneously covered by a number of mobile radio systems of different network operators. As a rule, however, the different network operators are allocated different frequency channels by regulating authorities which they are allowed to allocate to connections or, respectively, subscribers for the purpose of information transmission.

Due to a non-optimal cooperation between the different network operators, however, the mobile radio systems of different network operators often are not planned optimally so that interference problems frequently arise, especially in adjacent frequency ranges of different network operators. Increased interference also occurs within the mobile radio system of a network operator if cells of different size sizes are used in different frequency channels (different layers). This type of cell division is called hierarchical cell systems.

Figure 2:
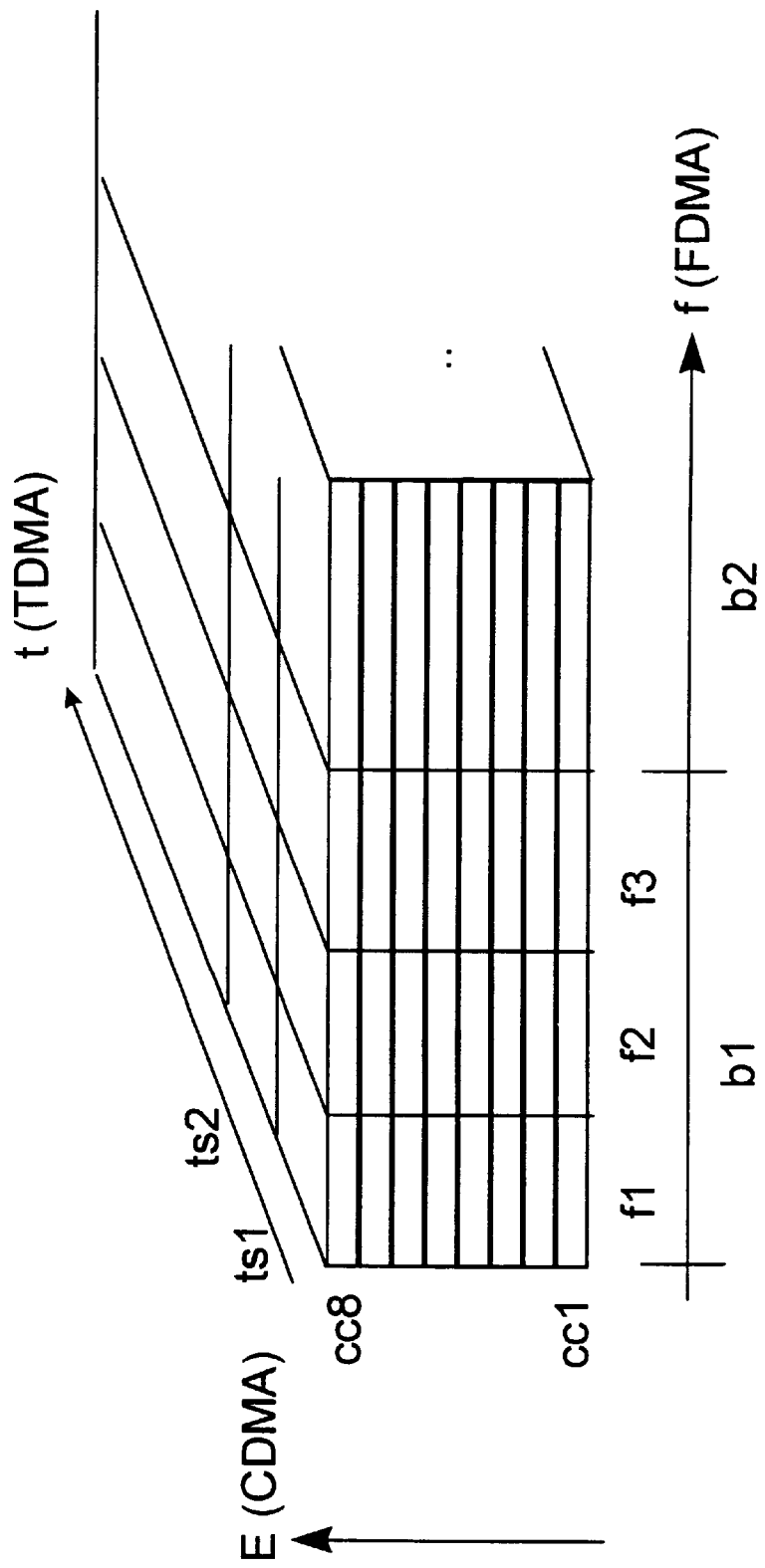
FIG. 2 shows a diagrammatic representation of multiple access methods.

FIG. 2 shows the frame structure of a possible multiple access method via which information, which is transmitted via a radio interface, can be separated and allocated to a certain connection or, respectively, the corresponding subscriber. For this purpose, a time division multiple access TDMA, a frequency division multiple access FDMA, a code division multiple access CDMA or a combination of a number of these multiple access methods can be used.

In the case of FDMA, frequency band b is split into a number of frequency channels f. These frequency channels are divided into time slots ts by time division multiple access TDMA. The signals transmitted within a time slot ts and a frequency channel f can be separated by connection-oriented spread-spectrum codes, so-called CDMA codes cc, modulated onto the information. The physical channels thus produced are allocated to logical channels in accordance with a predetermined scheme. The logical channels are basically separated into two types: signaling channels for transmitting signaling information and traffic channels for transmitting user information.

Figure 3:
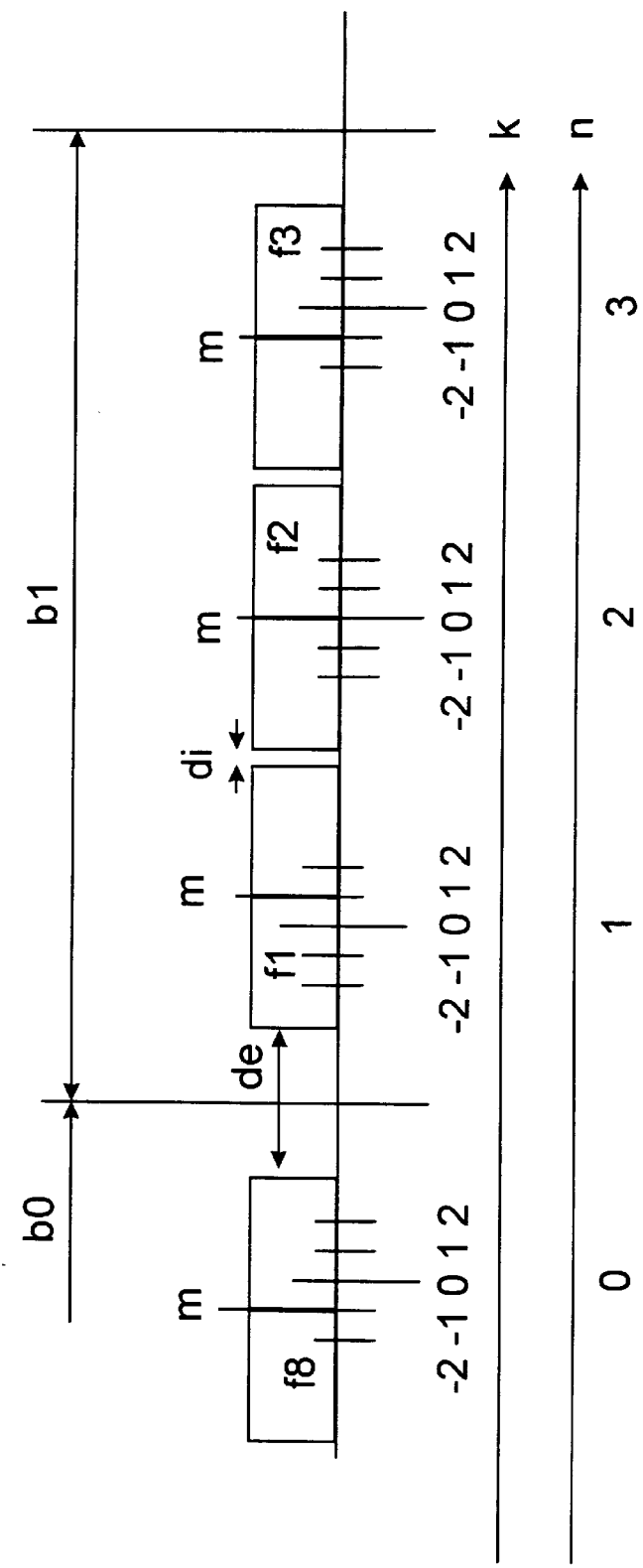
FIG. 3 shows a diagrammatic representation of a raster system for frequency channel arrangement in accordance with the teachings of the present invention.

FIG. 3 shows a first coarse raster system and a second fine raster system according to which the frequency channels f are arranged within frequency bands b. In this arrangement, for example, frequency band b1 is allocated to one network operator and frequency band b0 is allocated to another network operator. It is also possible for both frequency bands to be allocated to one network operator. A number of frequency channels f are arranged within the different frequency bands b.

In this arrangement, the frequency channels f1, f2, f3 within a frequency band b1 can be packed more densely, i.e. the internal frequency spacing di within a frequency band b1 between the frequency channels f1 and f2 and, respectively, f2 and f3 is smaller (narrower guard bands between frequency channels such as, for example, f1 and f2) than the external frequency spacing de between frequency channels f1 and f8 of different network operators (larger guard bands between frequency channels such as, for example, f1 and f8), and thus also of different frequency bands b which, as a rule, are allocated to different network operators. The result is that interference problems which occur primarily between adjacent frequency channels f8 and f1 of different network operators are reduced.

Increased interference also occurs within the mobile radio system of a network operator if adjacent frequency channels f are used in hierarchically structured radio cells of different size which are superimposed on one another. Therefore, it also can be advantageous to insert a greater frequency spacing, on a larger guard band, between the frequency channels f of different layers of the hierarchical structure than between frequency channels f of the same layer.

Depending on physical boundary conditions and network topology, the arrangement of the frequency channels g within the raster systems can be flexible so as to adapt to these physical boundary conditions such that interference is essentially prevented, especially between frequency channels f of different operators.

It is also possible for the frequency channels f to be arranged in accordance with other even finer or, respectively, coarser raster systems.

Furthermore, frequency channels f1, f2, f3 or, respectively, their center frequencies m (carrier frequency) also can be packed so densely that they overlap within a frequency band b or, respectively, within a layer. This, too, can lead to a total reduction in interference due to the reduction of interference between different frequency bands b or, respectively, different layers in spite of the increase in interference within either a frequency band or a layer.

The frequency range in which the fine raster system is defined, or in which the fine raster system covers a frequency range, can be restricted. The range of definition of the fine raster system which is restricted by the range of definition of the coarse raster system is thus restricted even further within the range of definition of the coarse raster system. This is for example, due, to the restriction to only certain intervals within the range of definition of the coarse raster system. Thus, only parts of the frequency range which is covered by the coarse raster system also are covered by the fine raster system and are, are, thus, defined as center frequency m.

The coarse raster system is scaled by integral numbers n, in which system the range of definition for n also can be restricted in accordance with the limited available frequency band. The fine raster system is scaled by integral numbers k, in which system a null point for the fine raster system is, in each case, located at the scaling points of the coarse raster system. The range of definition for k can be restricted so that the fine raster system is only defined in certain intervals of the total frequency range.

A frequency channel for future CDMA mobile radio systems such as a wide band CDMA system or a TD-CDMA system which is operated in FDD (Frequency Division Duplex) or TDD (Time Division Duplex) mode has a bandwidth of approximately, 4 MHz in accordance with a spreading of the digital signals with a chipping rate of approximately 4 megachips per second.

Due to the slowly falling modulation spectrum, a frequency spacing d (guard band) is necessary between the different frequency channels f for the purpose of adjacent-channel suppression. This guard band can be flexibly adapted to the respective physical boundary conditions. The coarse raster system is therefore allocated, for example, a scaling of 5 MHz. The fine raster system is allocated a scaling of, for example, 200 kHz.

On the basis of these raster systems, only frequency channels f, the center frequency m of which is located at a scale point of the fine raster system, are defined. The fine raster system is restricted in such a manner that it is only defined at particular intervals around the scale points of the coarse raster system.

In the text which follows, a method, based on the raster system described above, for restricted frequency channel search or scanning is described such method be carried out in an energy-saving manner by restricting the range of definition of the fine raster system.

After a mobile station MS has been switched on, especially in a foreign country or in other situations in which the mobile station MS attempts to become nearly registered in a mobile radio system, the synthesizer SYN of the radio-frequency section HF of the mobile station is set to all center frequencies m which are possible, in principle. If necessary, measurements are made to determine whether radio signals are received with a certain minimum power in this frequency channel. If radio signals are received with a certain minimum power, they are searched for a characteristic known synchronization sequence. If this characteristic synchronization sequence is being sent in this frequency channel, the mobile station MS synchronizes to the mobile radio system sending the synchronization sequence, processes the system information sent out via a signaling channel and registers in the mobile radio system in the case of a mobile radio system for which the mobile station MS is authorized. Otherwise, the synthesizer is set to the next frequency channel.

In the cases where no radio signals are sent at a certain minimum power in a frequency channel f or the characteristic synchronization sequence is not transmitted, the system also changes to the next frequency channel.

In conventional scanning methods, all center frequencies m which are possible, in principled, are searched, for example in 200 kHz steps. As a result, the scanning is very complex, especially in a foreign country where no a priori information about the center frequencies is known.

In contrast, only frequency channels f having a center frequency m of n*5 MHz+k*200 kHz are allowed, in principle, in accordance with an embodiment present invention. In this arrangement, n, as scaling of the coarse raster system, is an integral number, for example between 0 and 12 and k. As scaling of the fine raster system which describes the deviation from the coarse raster system, n is a positive or negative integral number, for example having an amount of less than 4, so that k 200 kHz is distinctly smaller than 5 MHz:

m=f0+n*5 MHz+k*200 kHz; where $-k_{max} \leq k < +k_{max}$; f0 is the lowest center frequency.

Thus, certain frequency channel arrangements are excluded, in principle. This results in distinctly less complexity and energy consumption for the frequency channel search such that: only ⅕ of the possible frequency channels (carrier frequencies) need to be scanned; there is sufficient flexibility for arranging frequency channels in order to avoid interference; the period for which the mobile stations are scanning for carrier frequencies can be reduced by 80% which results in a corresponding extension of the standby time; and the information for describing a certain frequency channel can be coded and transmitted efficiently which also increases the compatibility of future systems with systems already in existence, so-called second-generation systems such as, for example the GSM system since less information has to be transmitted via the signaling channels of these systems.

A further embodiment for efficient scanning provides that the frequency channels f having the center frequency m=n*5 MHz are first searched, then the frequency channels f having the center frequency m=n*5 MHz±1*200 kHz, then the frequency channels f having the center frequency m=n*5 MHz±2*200 kHz, etc., up to m=n*5 MHz±$k_{max}$*200 kHz.

Another embodiment for efficient scanning provides that the frequency channels f having the center frequency m=*n 5 MHz are searched first, then the frequency channels f having the center frequency m=n*5 MHz $k_{max}$ 200 kHz, then the frequency channels f having the center frequency m=*n5 MHz±($k_{max}$−1)*200 kHz, etc., up to frequency channels f having the center frequency m=n*5 MHz±1*200 kHz.

The restriction of the range of definition of k also can assume another defined set of discrete values such as, for example: k: −12, −7, −3, −1, 0, 1, 3, 7. In this context, the set of discrete values for k also can be different for each n.

Thus, frequency channels which are used with a greater probability are searched with priority by the mobile station MS. Information on prioritization of certain frequency channels can be stored in the mobile station MS or transmitted to the mobile station MS by the network operator via the mobile radio system from time to time.

The center frequency (carrier center frequency) thus can be determined in accordance with the following relation:
m=f0+n*fs+k*200 kHz, where
f0 lowest center frequency, the following holding true in an exemplary embodiment of the invention:
n=UARFCN div Nc.
k=(UARFCN mod Nc)-(Nc div 2);
Nc=number of possible carrier positions around a carrier in the coarse raster system; and
UARFCN=number of frequency channel used.

The first center frequency f0, fs (for example, fc=5 MHz) and the number of carriers in the finer raster system Nc depend on the chipping rate used and on the frequency band.

Such a carrier arrangement allows efficient coding and efficient first synchronization. It is also within the scope of the present invention to consider m not as a center frequency but, for example, as edge frequency of a radio channel, or to use another form for describing a radio channel.

A variant of the embodiment of the present invention provides for changing the set of frequency channels by adding frequency channels to the set or removing them from the set. This also can be done by prioritization of the frequency channels contained in the set. Such a change of the set of frequency channels to be scanned can be achieved by corresponding data which is transmitted to the control device of the radio station by the subscriber identity module or via the air interface.

Furthermore, a description of frequency channels based on the raster system described above can be done efficiently.

To administer or, respectively, operate a mobile radio system, signaling information which also contains information on a frequency channel f, such as, for example, for performing an inter-frequency handover or for transmitting an adjacent-channel list, etc. is transmitted in a multiplicity of situations, especially between base station BS and mobile station MS.

Via the description or, respectively, coding of a frequency channel f by the raster systems described above or, respectively, the corresponding scalings, the variable information n=2, k=3 (first variable information) can be transmitted, for example, for transmitting the information "frequency channel having a center frequency of 10.6

MHz". This information can be used in the receiving radio station, together with the constant information 5 MHz, 200 kHz (second constant information) stored there, for determining the center frequency m as follows:

m=2*5 MHz+3*200 kHz=10.6 MHz

If necessary, a constant stored value f0 can also be added to this:

m=f0+2*5 MHz+3*200 kHz=f0+10.6 MHz

Thus, information on frequency channels f which are to be used or are used, or, respectively, their center frequency m, can be transmitted from a mobile station MS to a base station BS or conversely with less complexity and a low number of bits.

Figure 4:
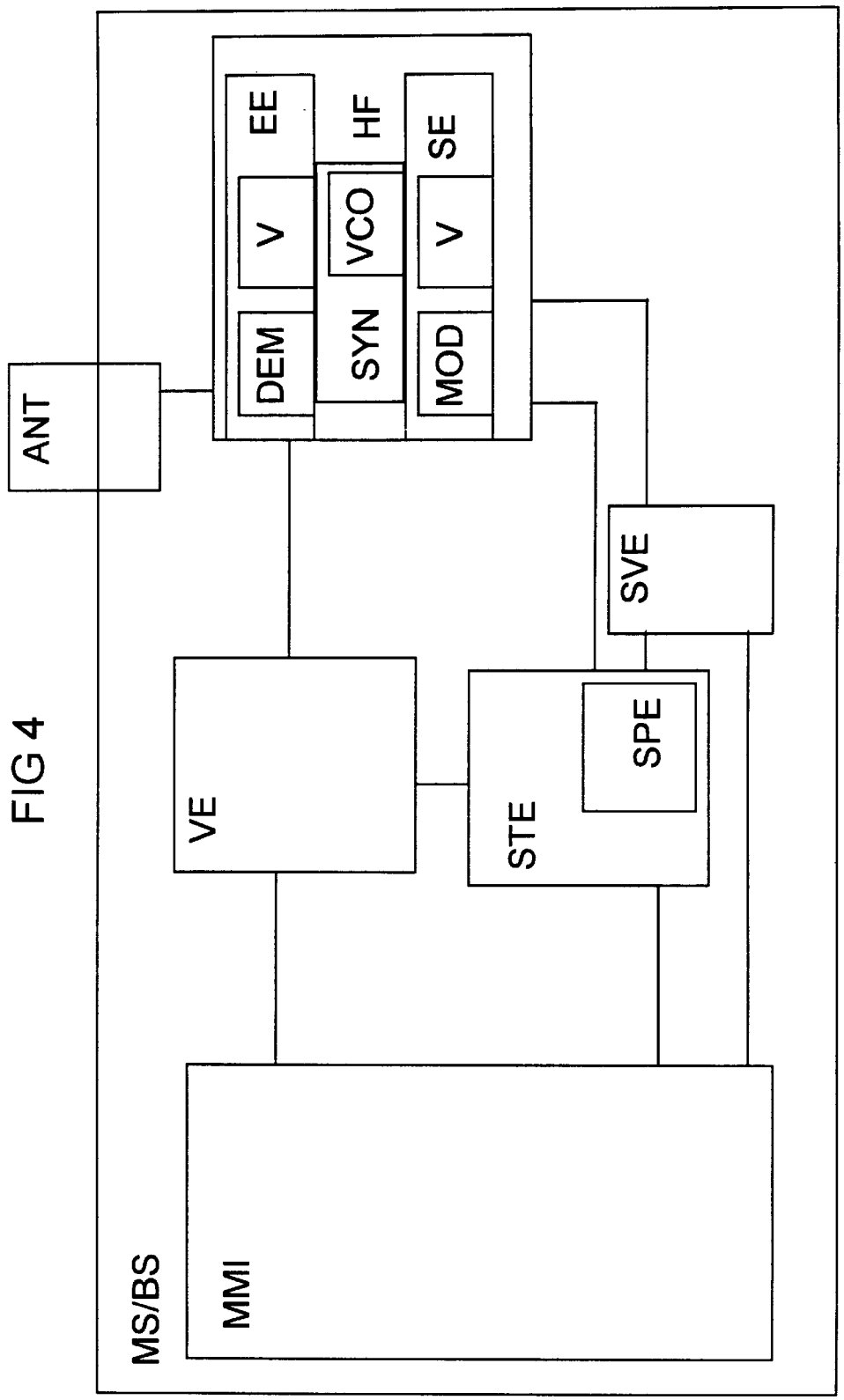
FIG. 4 shows a block diagram of a radio station.

FIG. 4 shows a radio station which can be a base station BS or a mobile station MS, which includes: a control device STE; a processing device VE; a power supply device. SVE; and a radio-frequency section HF, including consisting of a receiving device EE, a transmitting device SE, a frequency synthesizer SYN and an antenna device ANT. The individual elements of the radio station also are connected to one another via conductor tracks or bus systems. In addition, the mobile station contains an operating unit with, loudspeaker element and a microphone element includes.

The control device STE essentially includes a program-controlled microcontroller and the processing device VE includes a digital signal processor DSP. In arrangement, both devices can access memory chips SPE in a reading and writing manner.

The microcontroller controls and checks all essential elements and functions of the radio station MS/BS and the communication and signaling sequence.

The program data which is needed for controlling the radio station and the communication sequence, especially the signaling procedures, device information, information produced during the processing of signals and constant information on the raster system of frequency channels and their restriction of the range of definition, are stored in the volatile or non-volatile memory chips SPE.

The radio-frequency section HF includes a transmitting device SE, having a modulator and an amplifier V, and a receiving device EE having a demodulator and an amplifier V. The transmitting device SE and the receiving device EE are supplied with a frequency of a voltage-controlled oscillator VCO via the synthesizer SYN. The synthesizer SYN and the corresponding receiving filters are set to the desired center frequency m (carrier frequency) by the control device STE via control signals for the frequency channel search and for transmitting information. This can be done in accordance with methods described above.

During a CDMA transmission or, respectively, at CDMA radio stations, the information to be transmitted is spread in the processing device VE before modulation by a connection-oriented CDMA code (spread-spectrum code) and despread after the transmission. The investigation of the received radio signals with respect to the characteristic synchronization sequence possibly stored in the memory chips SPE also is performed via, the processing device VE.

Although the present invention has been described with reference to specific embodiments, those of skill in the art will recognize that changes may be made thereto without departing from the spirit and scope of the invention as set forth in the hereafter appended claim.

I claim as my invention:

1. A method for transmitting information between a base station and a mobile station, in which at least one frequency band which contains a plurality of frequency channels is available to at least one network operator for transmitting the information, the method comprising the steps of:

transmitting the information via radio signals substantially within at least one of the plurality of frequency channels at least from time to time;

arranging carrier center frequencies of the plurality of frequency channels within the frequency band according to a first coarse raster system, a raster pattern of the first coarse raster system essentially corresponding to a width of one frequency channel;

displacing the plurality of frequency channels with respect to the first coarse raster system in accordance with a second fine raster system; and restricting at least a range of definition of the fine raster system.

2. A method for transmitting information between a base station and a mobile station as claimed in claim 1, the method further comprising the step of:

performing a restricted frequency channel search, via the mobile station, only in accordance with information on the restriction of the range of definition of the fine raster system.

3. A method for transmitting information between a base station and a mobile station as claimed in claim 2, the method further comprising the step of:

searching certain values of the restricted range of definition of the fine raster system with preference during the restricted frequency channel search.

4. A method for transmitting information between a base station and a mobile station as claimed in claim 1, the method further comprising the steps of:

describing the coarse raster system and the fine raster system by variable information and constant information, respectively;

describing a frequency channel unambiguously by the variable information and the constant information;

storing the constant information in the mobile station; and transmitting the variable information to the mobile station.

5. A method for transmitting information between a base station and a mobile station as claimed in claim 1, the method further comprising the steps of:

describing the coarse raster system and the fine raster system by variable information and constant information, respectively;

describing a frequency channel unambiguously by variable information and the constant information;

storing the constant information in the base station; and transmitting the variable information to the base station.

6. A method for transmitting information between a base station and a mobile station as claimed in claim 1, the method further comprising the steps of:

transmitting the information in accordance with a CDMA method, wherein the radio signals are spread via a CDMA code and are transmitted within a frequency channel; and arranging the frequency channels such that, due to frequency spacings between the frequency channels, interference between the radio signals of the frequency channels is reduced.

7. A radio station, comprising:

a transmitting portion for transmitting information in a frequency band which contains a plurality of frequency channels, the information being transmitted via radio signals substantially within one of the plurality of frequency channels at least from time to time, carrier center frequencies of the frequency channels being arranged within the frequency band in accordance with a first coarse raster system having a raster pattern substantially corresponding to a width of one of the plurality of frequency channels such that an arrangement of the frequency channels can be displaced with respect to the first coarse raster system in accordance with a second fine raster system; and a storing portion for storing information on a restriction of a range of definition of at least the fine raster system.

8. A radio system as claimed in claim 7, further comprising:

means for performing a frequency channel search restricted in accordance with the information on the restriction of the range of definition of the fine raster system.

9. A radio system as claimed in claim 7, further comprising:

means for storing constant information for describing the coarse raster system and the fine raster system.

10. A radio system as claimed in claim 9, further comprising:

means for determining a frequency channel from the stored constant information and transmitted variable information.

11. A radio system as claimed in claim 7, further comprising:

means for transmitting information in accordance with a CDMA method, the radio signals being spread via a CDMA code transmitted substantially within a frequency channel; and means for arranging at least the frequency channel to be used such that, due to frequency spacings between the frequency channels, interference between the radio signals of the frequency channels is reduced.

* * * * *